(12) United States Patent
Fujinoi et al.

(10) Patent No.: US 11,049,209 B2
(45) Date of Patent: Jun. 29, 2021

(54) VEHICLE ALLOCATION MANAGEMENT DEVICE, VEHICLE ALLOCATION MANAGEMENT SYSTEM, VEHICLE ALLOCATION MANAGEMENT METHOD, PROGRAM, AND STORAGE MEDIUM

(71) Applicant: NS Solutions Corporation, Tokyo (JP)

(72) Inventors: Ryouma Fujinoi, Tokyo (JP); Keita Yoshio, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 16/759,273

(22) PCT Filed: Dec. 4, 2018

(86) PCT No.: PCT/JP2018/044561
§ 371 (c)(1),
(2) Date: Apr. 24, 2020

(87) PCT Pub. No.: WO2019/124058
PCT Pub. Date: Jun. 27, 2019

(65) Prior Publication Data
US 2020/0342559 A1    Oct. 29, 2020

(30) Foreign Application Priority Data

Dec. 18, 2017    (JP) .............................. JP2017-241806

(51) Int. Cl.
*G06Q 50/28*    (2012.01)
*G06K 7/10*    (2006.01)
(Continued)

(52) U.S. Cl.
CPC ......... *G06Q 50/28* (2013.01); *G06K 7/10366* (2013.01); *G06Q 10/06315* (2013.01); *G06Q 30/0185* (2013.01); *G08G 1/127* (2013.01)

(58) Field of Classification Search
CPC .... G06F 11/3442; G06F 16/00; G06F 16/381; G06Q 10/08; G06Q 10/087; G06Q 10/0875
(Continued)

(56) References Cited

U.S. PATENT DOCUMENTS

2001/0041948 A1* 11/2001 Ross ...................... G06Q 10/08
700/226
2003/0187720 A1* 10/2003 Takada ................... G06Q 10/04
705/7.31
(Continued)

FOREIGN PATENT DOCUMENTS

JP    2008-158841 A    7/2008
JP    2009-015684 A    1/2009
(Continued)

OTHER PUBLICATIONS

Decision to Grant a Patent issued by the Japanese Patent Office in corresponding Japanese Patent Application No. 2019-514329, dated Jun. 4, 2019.
(Continued)

*Primary Examiner* — Edwyn Labaze
(74) *Attorney, Agent, or Firm* — Arent Fox LLP (57) ABSTRACT

A vehicle allocation management device that can wirelessly communicate with a first reader device installed correspondingly to a stop area of a vehicle, including a receiver that receives, from the first reader device, radio field intensity information indicating the intensity of a radio field when the first reader device has received information from an electronic tag attached to the vehicle, a vehicle determiner that determines, based on the radio field intensity information, whether the vehicle is present in the stop area, and a vehicle allocation determiner that determines whether the vehicle is ready for allocation based on whether the vehicle is con-
(Continued)

tinuously present in the stop area for a predetermined time or more.

15 Claims, 8 Drawing Sheets

(51) Int. Cl.
*G06Q 10/06* (2012.01)
*G06Q 30/00* (2012.01)
*G08G 1/127* (2006.01)

(58) Field of Classification Search
USPC .............. 705/7.25–7.27; 235/385, 375, 487
See application file for complete search history.

(56) References Cited

U.S. PATENT DOCUMENTS

| | | | |
|---|---|---|---|
| 2009/0279499 A1* | 11/2009 | Machida | H04W 72/0486 370/330 |
| 2015/0339923 A1 | 11/2015 | Konig et al. | |
| 2016/0052762 A1* | 2/2016 | Swift | B60Q 9/00 340/425.5 |
| 2016/0253619 A1* | 9/2016 | Miles | G06Q 10/08 701/517 |
| 2018/0032920 A1* | 2/2018 | Ito | G06Q 10/06313 |
| 2018/0349850 A1* | 12/2018 | Hosoda | G06Q 10/087 |
| 2019/0141308 A1* | 5/2019 | Swope | H04N 13/204 |
| 2020/0074061 A1* | 3/2020 | Kim | G05D 1/0088 |
| 2020/0134955 A1* | 4/2020 | Kishita | G06F 21/35 |

FOREIGN PATENT DOCUMENTS

| | | |
|---|---|---|
| JP | 2014-164728 A | 9/2014 |
| JP | 2016-509287 A | 3/2016 |
| JP | 6549813 B1 | 7/2019 |

OTHER PUBLICATIONS

International Search Report issued in by the International Searching Authority in corresponding International Patent Application No. PCT/JP2018/044561, dated Feb. 12, 2019.

\* cited by examiner

VEHICLE LIST

| Vehicle | Location | Stop time |
|---------|-----------|-----------|
| A003 | Warehouse A | 35 min |
| A007 | Warehouse A | 51 min |
| C001 | Warehouse C | 67 min |

There are two drivers in shipping area.

FIG.7

RECEIVING/SHIPPING PREPARATION WORK STATUS INFORMATION

| | PLAN | RESULT | AVERAGE WORK TIME PER UNIT NUMBER | REMAINING WORK TIME | WORK DELAY TIME (= RESULT - PLAN) |
|---|---|---|---|---|---|
| Warehouse A | | | | | |
| Commodity a | 100 pieces | 95 pieces | 10min | 25min | -5min |
| Warehouse B | | | | | |
| Commodity b-1 | 1000 pieces | 980 pieces | 3min | 60min | +30min |
| Commodity b-2 | 500 pieces | 0 pieces | ?min | ?min | ?min |
| Warehouse C | | | | | |
| Commodity c | 200 pieces | 150 pieces | 5min | 250min | -10min |

VEHICLE ALLOCATION MANAGEMENT DEVICE, VEHICLE ALLOCATION MANAGEMENT SYSTEM, VEHICLE ALLOCATION MANAGEMENT METHOD, PROGRAM, AND STORAGE MEDIUM

CROSS-REFERENCE TO RELATED APPLICATIONS

This application is a National Stage entry of International Application No. PCT/JP2018/044561, filed on Dec. 4, 2018, which claims priority to Japanese Patent Application No. 2017-241806, filed on Dec. 18, 2017. The disclosures of the priority applications are hereby incorporated in their entirety by reference.

TECHNICAL FIELD

The present invention relates to a vehicle allocation management device, a vehicle allocation management system, a vehicle allocation management method, a program, and a storage medium.

BACKGROUND ART

Conventionally, in factories and warehouses, vehicles such as a plurality of forklifts are used to carry commodities. Patent Literature 1 discloses a technique for detecting the position of a vehicle based on an image captured by a camera mounted on a vehicle and outputting a work instruction to the vehicle based on a work plan and the position of the vehicle.

CITATION LIST

Patent Literature

Patent Literature 1: Japanese Laid-open Patent Publication No. 2009-15684

SUMMARY OF INVENTION

Technical Problem

However, the technique disclosed in the Patent Literature 1 requires grasping the work plan in advance and managing information relating to the work status of each vehicle, and raises a problem of being unable to perform flexible vehicle allocation management according to an instantaneous situation.

In view of the foregoing problem, the present invention intends to perform vehicle allocation management according to the situation without requiring complicated processing.

Solution to Problem

The present invention provides a vehicle allocation management device that can wirelessly communicate with a first reader device installed correspondingly to a stop area of a vehicle, including a receiver configured to receive, from the first reader device, radio field intensity information indicating the intensity of a radio field when the first reader device has received information from an electronic tag attached to the vehicle, a vehicle determiner configured to determine, based on the radio field intensity information, whether the vehicle is present in the stop area, and a vehicle allocation determiner configured to determine whether the vehicle is ready for allocation based on whether the vehicle is continuously present in the stop area for a predetermined time or more.

Advantageous Effects of Invention

According to the present invention, it is possible to perform vehicle allocation management according to the situation without requiring complicated processing.

DESCRIPTION OF EMBODIMENTS

Hereinafter, embodiments of the present invention will be described with reference to drawings.

Figure 1:
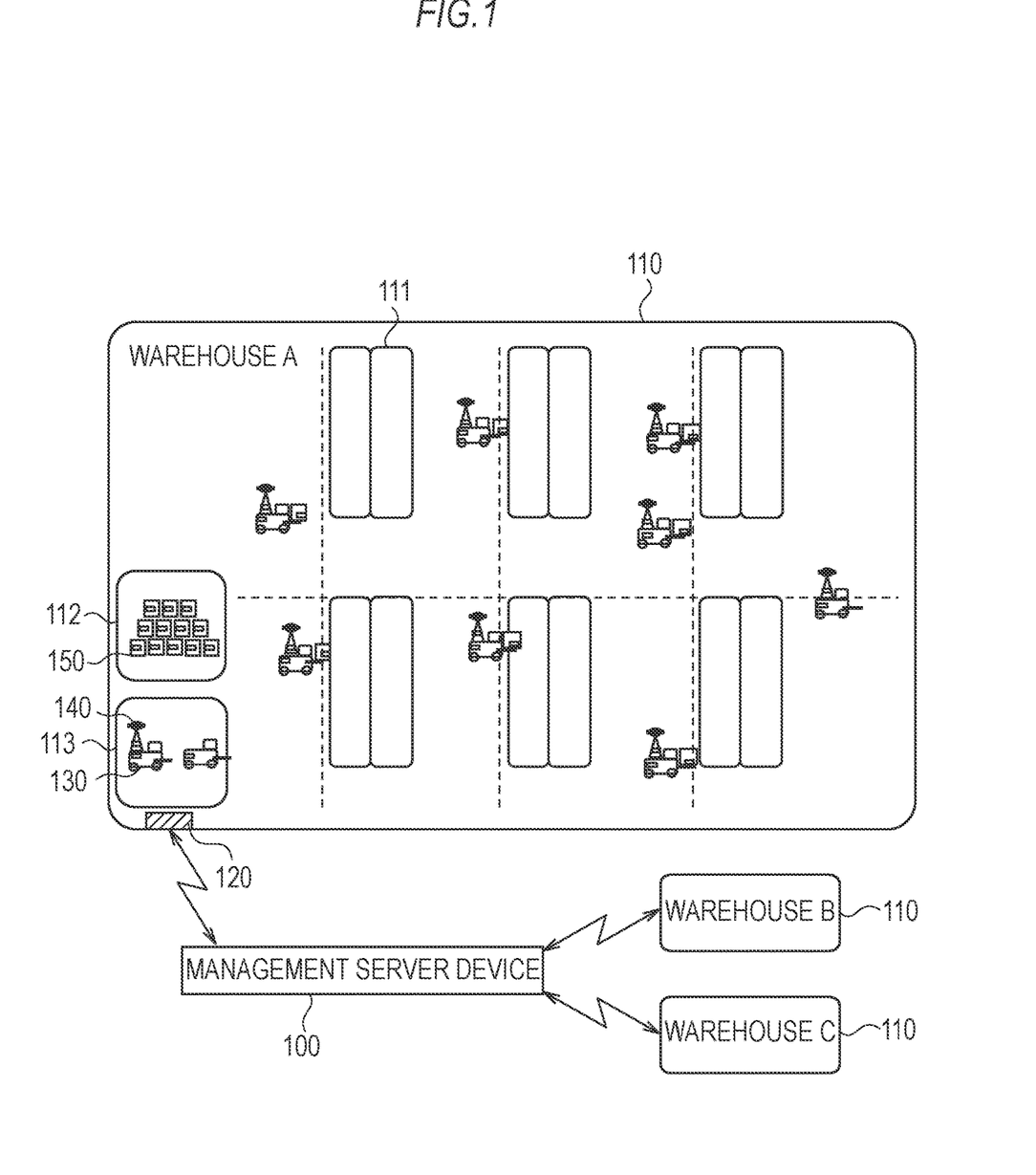
FIG. 1 is a diagram illustrating an overall configuration of a vehicle allocation management system.

FIG. 1 is a diagram illustrating an overall configuration of a vehicle allocation management system. The vehicle management system includes a management server device 100, and an RFID reader 120 that receives information from an RFID (radio frequency identifier) tag. In this embodiment, the management server device 100 is an exemplary vehicle allocation management device. The RFID tag is an exemplary electronic tag. The RFID reader 120 is an exemplary reader device. For example, it is needless to say that the system may be configured to use a small beacon as an electronic tag other than the RFID.

The management server device 100 manages the usage status of vehicles in each of a plurality of warehouses. The management server device 100 wirelessly communicates with the RFID reader 120 provided in each of the plurality of warehouses. Although FIG. 1 illustrates the interior of only a warehouse A for convenience, the interior of another warehouse (warehouse B or warehouse C) is similar to the interior of the warehouse A. Hereinafter, when it is necessary to distinguish each warehouse, the plurality of warehouses 110 will be referred to as the warehouse A, the warehouse B, and the warehouse C, respectively, as appropriate. Each warehouse is an exemplary management area of the management server device 100.

In each warehouse 110, a shipping preparation work for a plurality of commodities 150 stored in the warehouse 110 is performed. The shipping preparation work is a work in which a worker (person) 140 gets into a vehicle 130, takes out a predetermined number of commodities 150 to be shipped from a shelf 111, and conveys them to an outgoing area 112. The commodities collected in the outgoing area 112 are subsequently shipped to each destination. The vehicle 130 is a working vehicle such as a forklift, but is not limited to this, and may be a truck or the like as another example. The outgoing area 112 is an exemplary accumulation area where the commodities 150 are accumulated.

Further, in the present embodiment, it is supposed that vehicles not used for work are stopped in a stop area 113. The outgoing area 112 and the stop area 113 are provided at adjacent positions, and the RFID reader 120 is installed at a position neighboring these areas. The RFID reader 120 can determine, based on the radio field intensity at the time of receiving information, whether a transmission source of the information is present in the outgoing area 112 or in the stop area 113. It is sufficient that the RFID reader 120 is installed at any position where the RFID reader 120 can wirelessly communicate with the RFID tags that are present in the outgoing area 112 and the stop area 113. That is, it is sufficient to install the RFID reader 120 at any position corresponding to the outgoing area 112 and the stop area 113, and the concrete position is not limited to the embodiment.

Figure 2:
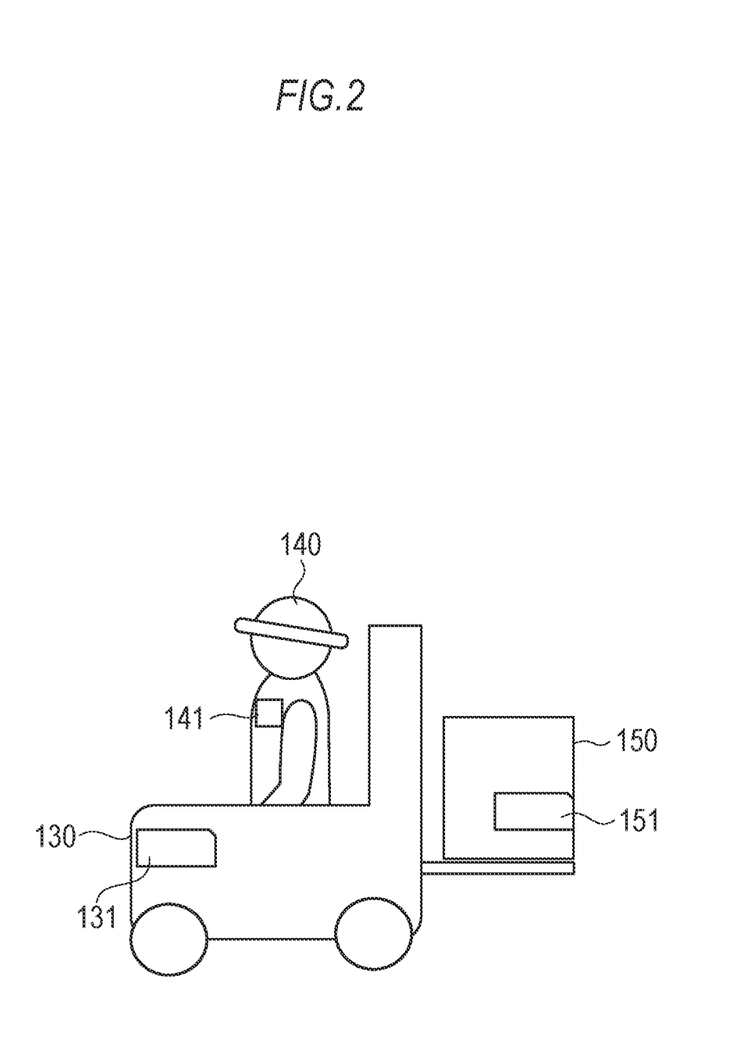
FIG. 2 is an explanatory diagram of an electronic tag.

FIG. 2 is an explanatory diagram of the RFID tag. RFID tags 131, 141, and 151 are put on the vehicle 130, the worker 140, and the commodity 150, respectively. Each of the RFID tags 131, 141, and 151 stores tag information. The tag information stored in each of the RFID tags 131, 141, and 151 includes type information and identification information. In the embodiment, the type information is information indicating whether the type of an object to which the RFID tag is put is the worker 140, the vehicle 130, or the commodity. The identification information is information for identifying an individual in each type.

The RFID reader 120 performs wireless communications with these RFID tags 131, 141, and 151. In the present embodiment, the RFID reader 120 receives tag information from respective RFID tags at predetermined time intervals, for example, every two seconds. Further, it is further supposed that, each time the RFID reader 120 receives the tag information, the RFID reader 120 detects the radio field intensity at the time of reception of the tag information. And, the RFID reader 120 transmits, to the management server device 100, radio field intensity information indicating the radio field intensity and the tag information while associating them with each other. That is, the management server device 100 periodically receives, from the RFID reader 120, radio field intensity information corresponding to the tag information received by the RFID reader 120.

Figure 3:
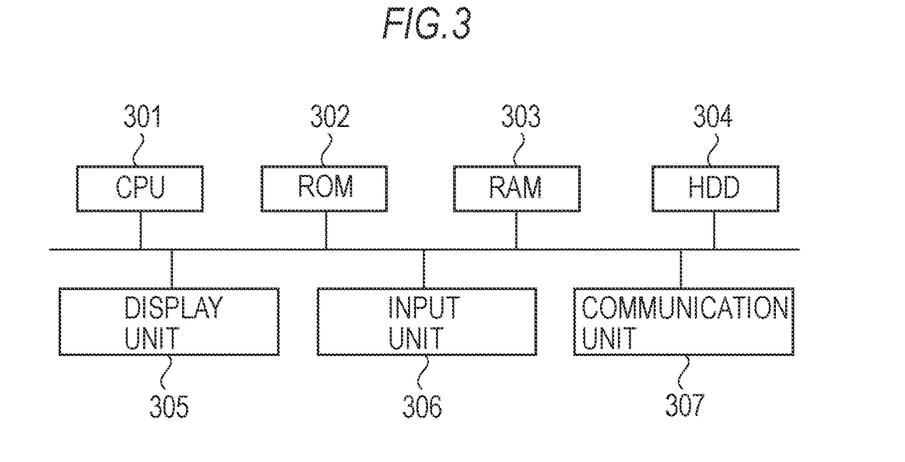
FIG. 3 is a diagram illustrating a hardware configuration of a management server device.

FIG. 3 is a diagram illustrating a hardware configuration of the management server device 100. The management server device 100 includes a CPU 301, a ROM 302, a RAM 303, an HDD 304, a display unit 305, an input unit 306, and a communication unit 307. The CPU 301 reads out a control program stored in the ROM 302 and executes various processing. The RAM 303 is used as a temporary storage area such as a main memory of the CPU 301 and a work area. The HDD 304 stores various data, various programs, and the like. The display unit 305 displays various information. The input unit 306 includes a keyboard and a mouse, and accepts various operations performed by a user. The communication unit 307 performs wireless communications with an external device such as the RFID reader 120. The communication unit 307 may be configured to perform wired communications with the RFID reader 120 or the like, and the configuration is not limited particularly.

The CPU 301 reads out programs stored in the ROM 302 or the HDD 304 and executes each program to realize functions and processing of the management server device 100 described below. As another example, the CPU 301 may read out a program stored in a recording medium such as an SD card instead of the ROM 302 or the like.

Further, as another example, at least a part of the functions and processing of the management server device 100 may be realized by cooperation of, for example, a plurality of CPUs, RAMs, ROMs, and storages. Moreover, as another example, at least a part of the functions and processing of the management server device 100 may be realized by using a hardware circuit.

Figure 4:
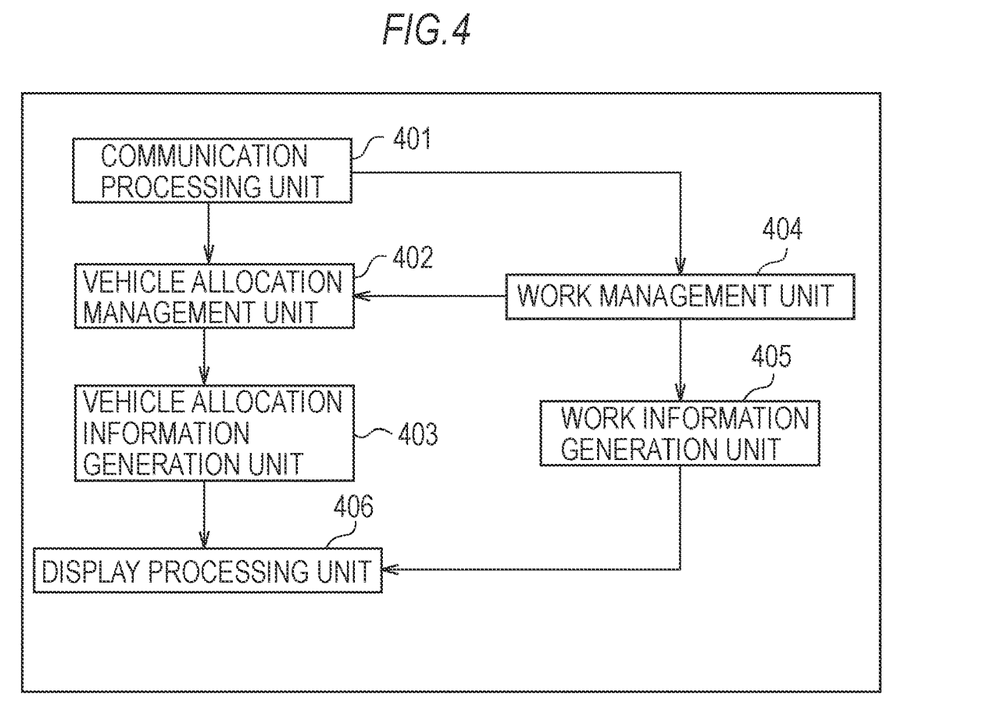
FIG. 4 is a diagram illustrating a functional configuration of the management server device.

FIG. 4 is a diagram illustrating a functional configuration of the management server device 100. The management server device 100 includes a communication processing unit 401, a vehicle allocation management unit 402, a vehicle allocation information generation unit 403, a work management unit 404, a work information generation unit 405, and a display processing unit 406. The communication processing unit 401 controls communications. The vehicle allocation management unit 402 performs, based on information received by the communication processing unit 401, processing relating to vehicle allocation in each warehouse, such as processing for determining whether there is any vehicle 130 ready for allocation in another warehouse, that is, processing for determining whether the vehicle is ready for allocation. The vehicle allocation information generation unit 403 generates vehicle allocation information. In this embodiment, the vehicle allocation information is information based on a determination result by the vehicle allocation management unit 402, such as the presence of any vehicle 130 that is ready for allocation to another warehouse. The vehicle allocation information may include, in addition to the determination whether each vehicle is ready for allocation, various information that may be referred to by a person in charge of vehicle allocation when allocating vehicles (such as stop time or the presence of a driver), the priority in vehicle allocation, and information about a destination such as a warehouse to which the vehicle is allocated. Further, the work management unit 404 manages, based on the information received by the communication processing unit 401, the status of a work such as a shipping preparation work, which is currently performed in the warehouse. The work information generation unit 405 generates work information. In this embodiment, the work information is information indicating the status of a work that is currently performed in each warehouse. The processing in each unit will be described in detail below with reference to FIG. 5.

Figure 5:
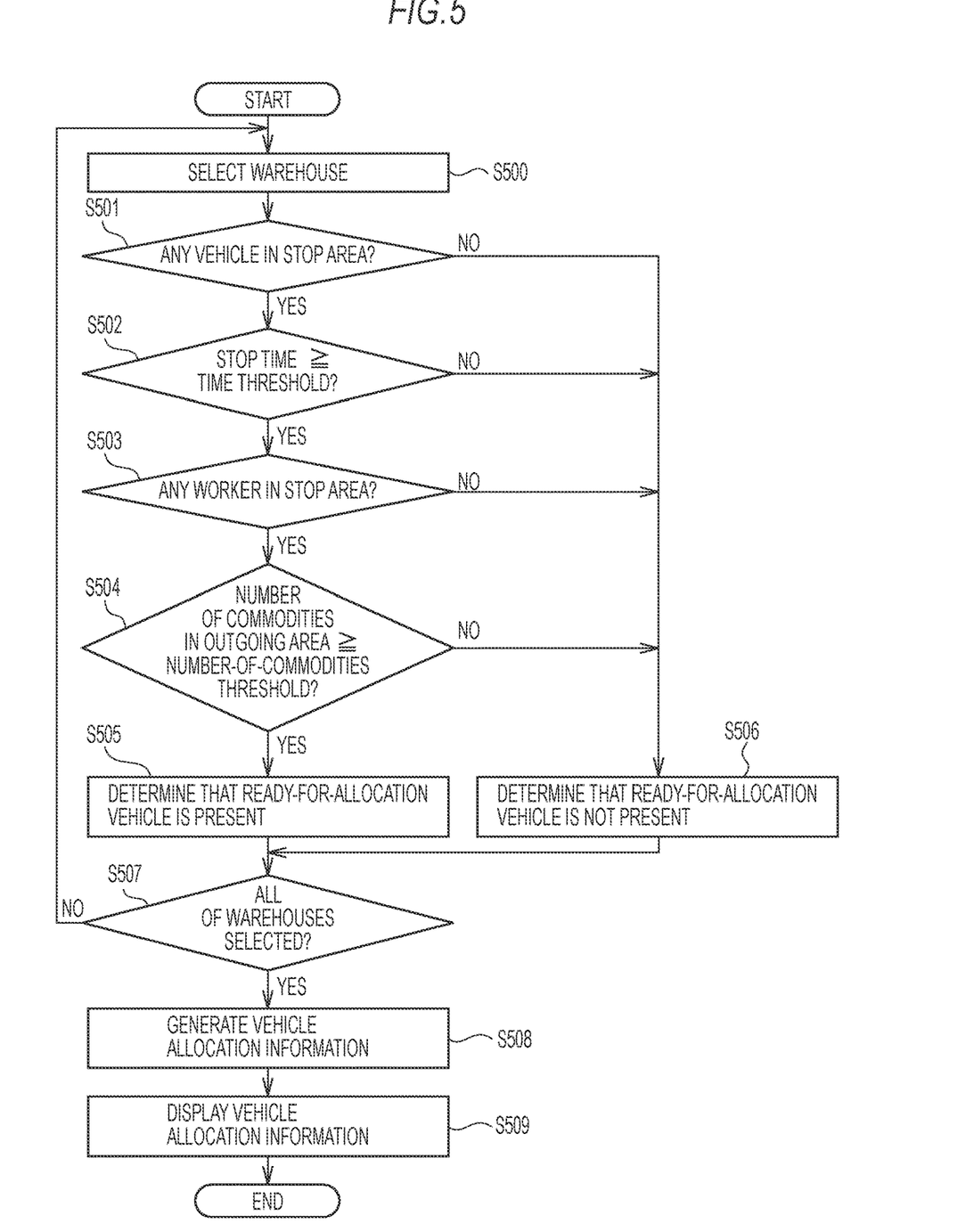
FIG. 5 is a flowchart illustrating vehicle allocation processing.

FIG. 5 is a flowchart illustrating vehicle allocation processing performed by the management server device 100. In step S500, the vehicle allocation management unit 402 selects one warehouse to be processed. It is sufficient that the vehicle allocation management unit 402 successively selects all the warehouses to be managed, and the selection order is not limited particularly. Hereinafter, the warehouse selected in step S500 is referred to as a target warehouse. Next, in step S501, the vehicle allocation management unit 402 determines whether the vehicle 130 is present in the stop area 113 of the target warehouse based on tag information and radio field intensity information corresponding to the vehicle 130, which the communication processing unit 401 has received from the RFID reader 120 installed in the target warehouse. More specifically, the vehicle allocation management unit 402 determines that the vehicle 130 is present in the stop area 113 when receiving tag information of the vehicle 130 associated with radio field intensity information indicating the intensity of a radio field that is equal to or greater than an intensity threshold. In this embodiment, it is supposed that the intensity threshold is set in advance according to a positional relationship between the RFID reader 120 and the stop area 113. When the vehicle allocation management unit 402 determines that the vehicle 130 is present (YES in step S501), the processing proceeds to step S502. When the vehicle allocation management unit 402 determines that the vehicle 130 is not present (NO in step S501), the processing proceeds to step S506. The processing in step S501 is an example of vehicle determination processing.

In step S502, the vehicle allocation management unit 402 specifies the stop time of the vehicle 130 existing in the stop area 113 based on tag information and radio field intensity reception status corresponding to the vehicle 130 that has been determined in step S501 as being present in the stop area 113. Then, when the vehicle allocation management unit 402 determines that the stop time is equal to or greater than a time threshold (YES in step S502), the processing proceeds to step S503. When the vehicle allocation management unit 402 determines that the stop time is less than the time threshold (NO in step S502), the processing proceeds to step S506. In this embodiment, the time threshold is a preset value such as 30 minutes. The processing in step S502 is an example of processing for determining whether the presence in the stop area is continuously for a predetermined time or more. Further, the processing in step S502 is performed for each vehicle if a plurality of vehicles 130 is detected in step S501.

In step S503, the vehicle allocation management unit 402 determines whether the worker 140 is present in the stop area 113 of the target warehouse based on tag information and radio field intensity information corresponding to the worker 140, which the communication processing unit 401 has received from the RFID reader 120 installed in the target warehouse. Like the processing in step S501, the vehicle allocation management unit 402 determines that the worker 140 is present in the stop area 113 when receiving tag information of the worker 140 associated with radio field intensity information indicating the intensity of a radio field that is equal to or greater than the intensity threshold. When the vehicle allocation management unit 402 determines that when the worker 140 is present (YES in step S503), the processing proceeds to step S504. When the vehicle allocation management unit 402 determines that the worker 140 is not present (NO in step S503), the processing proceeds to step S506. In this embodiment, the processing in step S503 is an example of person determination processing.

In step S504, the vehicle allocation management unit 402 specifies the number of commodities 150 that are present in the outgoing area 112 of the target warehouse based on tag information and radio field intensity information corresponding to the commodity 150, which the communication processing unit 401 has received from the RFID reader 120 installed in the target warehouse. The processing in this step is an example of number-of-commodities specifying processing. When the vehicle allocation management unit 402 determines that the specified number of commodities 150 is equal to or greater than a number-of-commodities threshold (YES in step S504), the processing proceeds to step S505. When the vehicle allocation management unit 402 determines that the specified number of commodities 150 is less than the number-of-commodities threshold (NO in step S504), the processing proceeds to step S506. In this embodiment, the number-of-commodities threshold is a preset value. In step S505, the vehicle allocation management unit 402 determines that the vehicle 130 ready for allocation to another warehouse is present in the target warehouse, that is, determines that the ready-for-allocation vehicle 130 for another warehouse is present. Subsequently, the processing proceeds to step S507. On the other hand, in step S506, the vehicle allocation management unit 402 determines that the ready-for-allocation vehicle 130 is not present in the target warehouse. Subsequently, the processing proceeds to step S507. The processing in steps 5501 through 5506 is an example of vehicle allocation determination processing for determining whether the ready-for-allocation vehicle 130 is present in the stop area 113.

As mentioned above, the management server device 100 determines that the vehicle is ready for allocation not only when the vehicle 130 is present in the stop area 113 but also when three conditions are satisfied. In this embodiment, the first condition is that the stop time of the vehicle 130 is equal to or greater than the time threshold. When the stop time is short, there is a case where the vehicle temporarily stops at the stop area 113 during the work and the vehicle 130 detected in the stop area 113 is not ready for allocation. The first condition is for preventing the ready-for-allocation determination from being made for the vehicle 130 in such a case.

The second condition is that the worker 140 is present in the stop area 113. Even when the ready-for-allocation vehicle 130 is stopped in the stop area 113, if the worker 140 is not present, the vehicle 130 cannot be operated and hence cannot be used substantially. The second condition is for preventing the ready-for-allocation determination from being made in such a case.

The third condition is that the number of commodities 150 existing in the outgoing area 112 is equal to or greater than the number-of-commodities threshold. Even when the vehicle 130 is stopped in the stop area 113, if a shipping work is not yet completed, the vehicle 130 is likely to be used for this shipping work and allocation of this vehicle for a work in another warehouse may not be appropriate. The third condition is for preventing the ready-for-allocation determination from being made in such a case.

In step S507, the vehicle allocation management unit 402 determines whether all of the plurality of warehouses to be managed have been selected. When the vehicle allocation management unit 402 has selected all of the warehouses and completed the ready-for-allocation determination (YES in step S507), the processing proceeds to step S508. When the vehicle allocation management unit 402 determines that there is a warehouse not yet selected (NO in step S507), the processing proceeds to step S500. In this case, in step S500, the vehicle allocation management unit 402 selects a remaining warehouse and performs the processing in step S501 and following steps.

In step S508, the vehicle allocation information generation unit 403 generates vehicle allocation information indicating the determination result with respect to whether the vehicle is ready for allocation, which has been obtained for each warehouse. Next, in step S509, the vehicle allocation information generation unit 403 controls the display unit 305 to display the vehicle allocation information. It is sufficient to configure the management server device 100 so as to output the vehicle allocation information, the concrete output destination is not limited to the embodiment. As another example, the management server device 100 may generate audio vehicle allocation information and control a speaker to output voice information. Further, as another example, the management server device 100 may transmit the vehicle allocation information to an external device. The processing in these examples is an example of output control processing for controlling the output of the vehicle allocation information.

Figure 6:
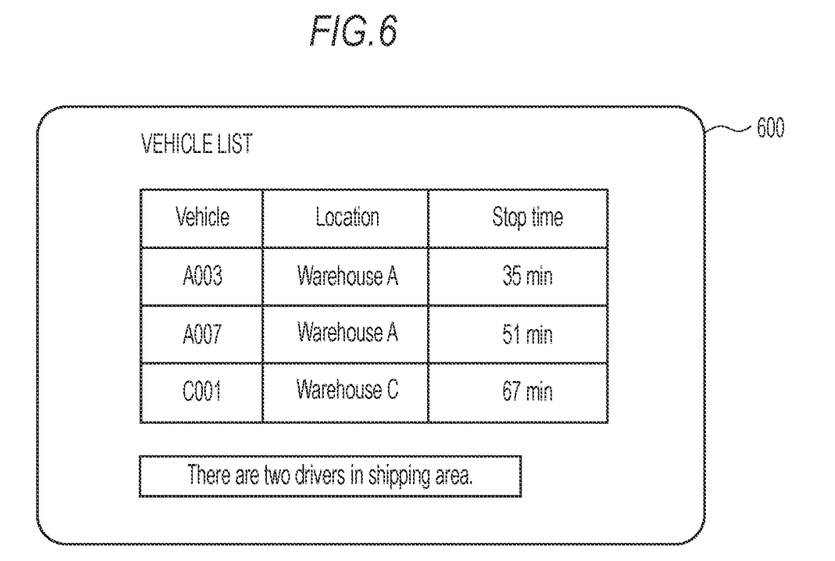
FIG. 6 is a diagram illustrating a display example of usage information.

FIG. 6 is a diagram illustrating a display example of the vehicle allocation information. Vehicle allocation information 600 includes a list of ready-for-allocation vehicles and the number of workers (drivers) who can operate the vehicles. Further, identification information of the vehicle 130, location where the vehicle 130 is present (warehouse name), and continuous stop time are displayed in association with each other in the vehicle list. By viewing the vehicle allocation information 600, a vehicle allocation manager can perform vehicle allocation appropriately, for example, can dispatch a ready-for-allocation vehicle 130 to another warehouse.

Figure 7:
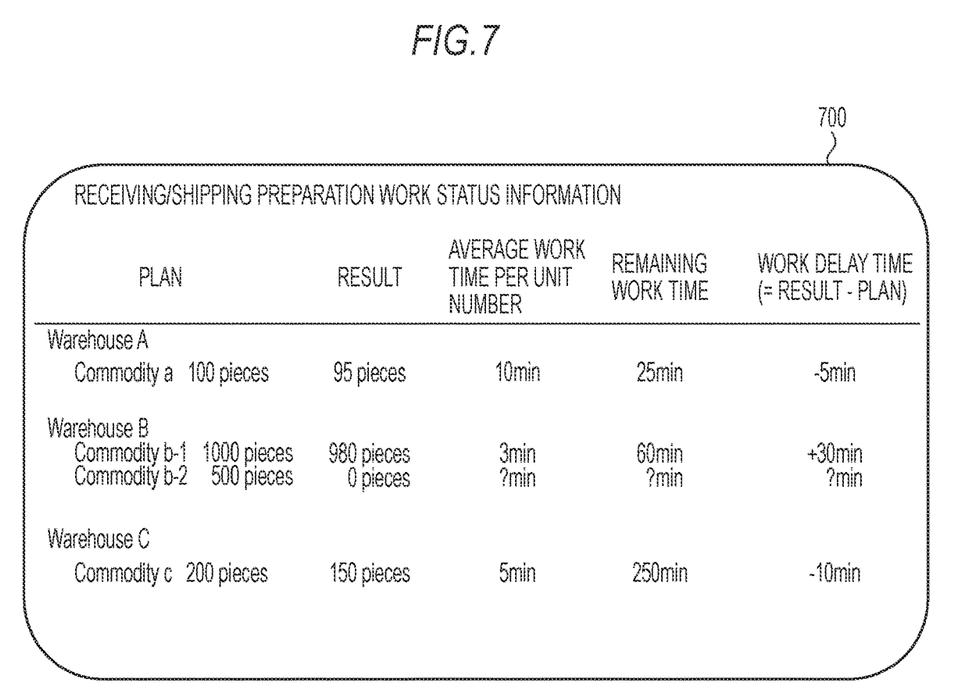
FIG. 7 is a diagram illustrating a display example of work information.

Next, processing of the work management unit 404 and the work information generation unit 405 illustrated in FIG. 4 will be described. The work management unit 404 specifies the work status according to a change in the number of commodities 150 in the outgoing area 112 of each warehouse. This processing is an example of work specifying processing. Then, the work information generation unit 405 generates work information. The work information is displayed on the display unit 305 by the display processing unit 406. FIG. 7 illustrates a display example of the work information. Work information 700 includes, for each warehouse, planned shipping quantity, actual result, average work time, remaining work time, and work delay time. The planned shipping quantity is a value having been set in advance for each warehouse. The actual result is the number of commodities 150 actually prepared in the outgoing area 112 at the time of processing. The average work time is a value calculated according to the actual result from start of the work to the time of processing and indicates the work time required for one commodity 150. The remaining work time is a work time to the end time, which is obtained from the average work time. The work delay time is a delay time from a predetermined work time (plan), which is predictable from the remaining work time. Since the progress of the work, such as the work time and the actual result, is displayed in this manner, the manager can confirm the work status appropriately.

As mentioned above, the management server device 100 according to the first embodiment can perform vehicle allocation management according to the situation without requiring complicated processing.

A first modified example of the first embodiment will be described. In the first embodiment, the stop area 113 is provided adjacent to the outgoing area 112 so that one RFID reader 120 can detect electronic tags not only in the stop area 113 but also in the outgoing area 112. However, the stop area 113 may be provided at a place different from the outgoing area 112. In this case, it is supposed that, in addition to the RFID reader 120 corresponding to the stop area 113, another RFID reader 120 is installed at a position corresponding to the outgoing area 112. Further, it is supposed that the management server device 100 performs determination relating to the commodity 150 according to information from the RFID reader 120 installed at the position corresponding to the outgoing area 112.

As a second modified example, the vehicle allocation management unit 402 may simply determine that the vehicle is ready for allocation when the vehicle 130 is present in the stop area 113 and the stop time of the vehicle 130 existing in the stop area 113 is equal to or greater than the threshold. That is, it may be unnecessary for the vehicle allocation management unit 402 to take the presence of the worker 140 and the number of commodities 150 in the outgoing area 112 into consideration. In this case, it is only required to attach the RFID tag 131 to the vehicle 130, and it is unnecessary to attach the RFID tags to the worker 140 and the commodities 150. Since the RFID reader 120 receives tag information only from the RFID tag 131 of the vehicle 130, it can be known that what corresponds to the received tag information is the vehicle 130. Therefore, in this case, the management server device 100 may receive only the radio field intensity from the RFID reader 120 because the vehicle 130 can be identified without receiving tag information. Then, the management server device 100 may make, based on the radio field intensity information, a determination whether the vehicle 130 is present in the stop area 113 and a determination with respect to the stop time.

As a third modified example, the work content is not limited as long as the work is accompanied by transportation of the commodities 150, although the shipping preparation work has been exemplarily described in the first embodiment. As another example, the management server device 100 may perform vehicle allocation management at the time of a warehousing work. In this case, it is supposed that the warehousing work includes moving the commodities 150 placed in an incoming area onto shelves. In this case, the management server device 100 detects the commodities 150 in the incoming area, instead of the outgoing area 112. Then, in step S504, the management server device 100 determines whether the number of commodities 150 in the incoming area is equal to or greater than the number-of-commodities threshold.

As a fourth modified example, the management server device 100 further specifies the warehouse in which the ready-for-allocation vehicle 130 is present and the warehouse in which the ready-for-allocation vehicle 130 is not present. This processing is an example of area specifying processing for specifying the management area (warehouse). When detecting the warehouse in which the ready-for-allocation vehicle 130 is present and also the warehouse in which the ready-for-allocation vehicle 130 is not present, the management server device 100 may output delivery destination information to move the ready-for-allocation vehicle 130 to the warehouse in which the ready-for-allocation vehicle 130 is not present. Further, in addition to confirming the presence of the warehouse in which the ready-for-allocation vehicle 130 is not present, the management server device 100 may determine the destination warehouse to which the ready-for-allocation vehicle 130 is to be moved as a vehicle allocation requiring warehouse, based on the number of commodities 150 in the outgoing area 112 of the warehouse in which the ready-for-allocation vehicle 130 is not present, with reference to the planned shipping quantity. Further, with reference to the work information, the management server device 100 may preferentially determine, as a movement destination, the warehouse in which the operation rate of the vehicle 130 is high and the actual result is delayed from the plan. In addition, the conditions referable in determining the vehicle allocation may be set in advance to the management server device 100 by a user.

As a fifth modified example, for example, there is a case in which the worker 140 who can operate the vehicle 130 may be limited depending on the type of the vehicle 130 or the like. In such a case, the management server device 100 may specify the worker 140 who can operate the vehicle 130 with reference to the identification information of the worker 140 and the identification information of the vehicle 130. In this case, it is supposed that the management server device 100 determines, in step S503, whether the worker 140 who can operate the vehicle 130 existing in the stop area 113 is present in the stop area 113. As described above, when the combination of the vehicle 130 and the worker 140, or the combination of the vehicle 130 and the commodities 150, is limited, the management server device 100 can determine, taking such a limitation into consideration, whether the vehicle 130 is ready for allocation.

As a sixth modified example, in the shipping preparation work in the warehouse, an inspection work may be performed for the commodity 150 placed in the outgoing area 112 after completion of carry-out preparation, and an external device of the management server device 100, such as an inspection management device, may manage the work result. In this case, the management server device 100 may receive, from the inspection management device, information indicating the number of commodities 150 whose inspection has been completed. In this case, the management server device 100 obtains, as remaining quantity, a difference between the planned shipping quantity and the number of commodities 150 whose inspection has been completed. Then, the control may be performed in such a manner that the management server device 100 checks the remaining quantity in step S504 and the processing proceeds to step S505 when the remaining quantity is less than a commodity threshold or to step S506 when the remaining quantity is equal to or greater than the commodity threshold.

As a seventh modified example, the management target is not limited to warehouses, although the management server device 100 is exemplarily described to perform vehicle allocation management for a plurality of warehouses in the first embodiment. As another example, the management server device 100 may perform vehicle allocation management for a plurality of factories.

As an eighth modified example, the number of RFID readers 120 to be installed in each warehouse is not limited. Installing more RFID readers 120 can more accurately grasp the positions of the vehicle 130, the worker 140, and the commodities 150.

As a ninth modified example, the management server device 100 may determine whether the worker 140 is on the vehicle 130 based on the tag information and the radio field intensity of each of the vehicle 130 and the worker 140. Further, when the worker 140 is on the vehicle 130, the management server device 100 may determine that the vehicle 130 is not ready for allocation. This processing is an example of riding determination processing.

As a tenth modified example, the management server device 100 may determine whether the commodities 150 are loaded on the vehicle 130 based on the tag information and the radio field intensity of each of the vehicle 130 and the commodities 150. Further, when the commodities 150 are loaded, the management server device 100 may determine that the vehicle 130 is not ready for allocation. This processing is an example of loading determination processing.

As an eleventh modified example, the processing of the management server device 100 may be realized by a vehicle allocation management system including a plurality of devices. That is, the plurality of devices constituting the vehicle allocation management system may share the processing of the management server device 100 described in the embodiment.

Second Embodiment

Figure 8:
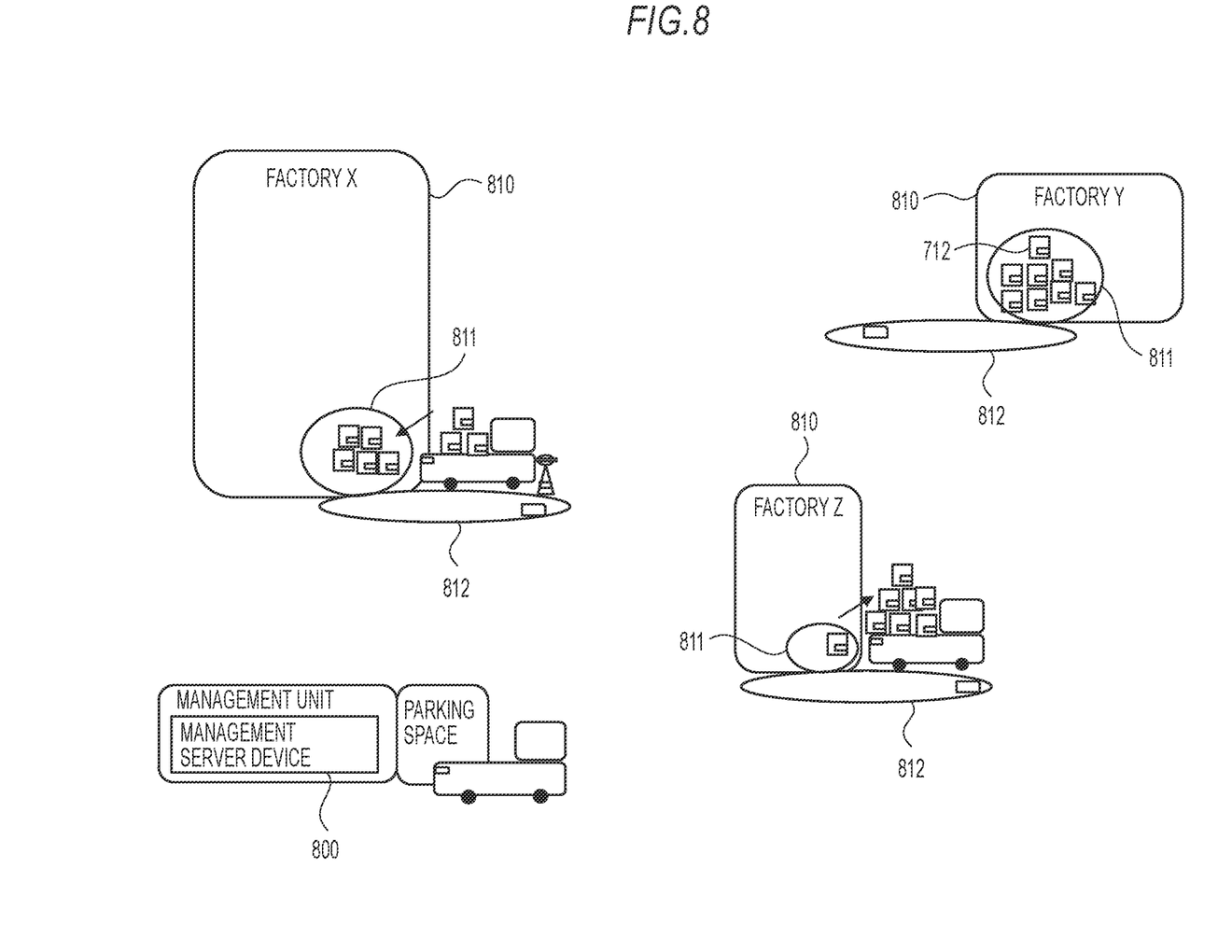
FIG. 8 is a diagram illustrating an overall configuration of a vehicle allocation management system according to a second embodiment.

FIG. 8 is a diagram illustrating an overall configuration of a vehicle allocation management system according to the second embodiment. Here, features of the second embodiment different from those of the first embodiment will be mainly described. The management server device 100 according to the second embodiment manages the usage status of vehicles 130 in each of a plurality of factories provided at relatively remote locations. The management server device 100 wirelessly communicates with the RFID reader 120 provided in each of the plurality of factories. In the present embodiment, it is supposed that the transportation of the commodities 150 is performed between the factories each serving as a logistic base. The vehicle 130 stops at a stop area 812, and a work for loading/unloading the commodities 150 is performed in an incoming/outgoing area 811 provided adjacent to the stop area 812. Further, it is supposed that the RFID reader 120 is provided correspondingly to each of the incoming/outgoing area 811 and the stop area 812. In the present embodiment, the vehicle 130 is a truck. The management server device 100 is provided, for example, in a production management unit that controls the factory, and receives data from the RFID reader 120 installed in each factory.

Figure 9:
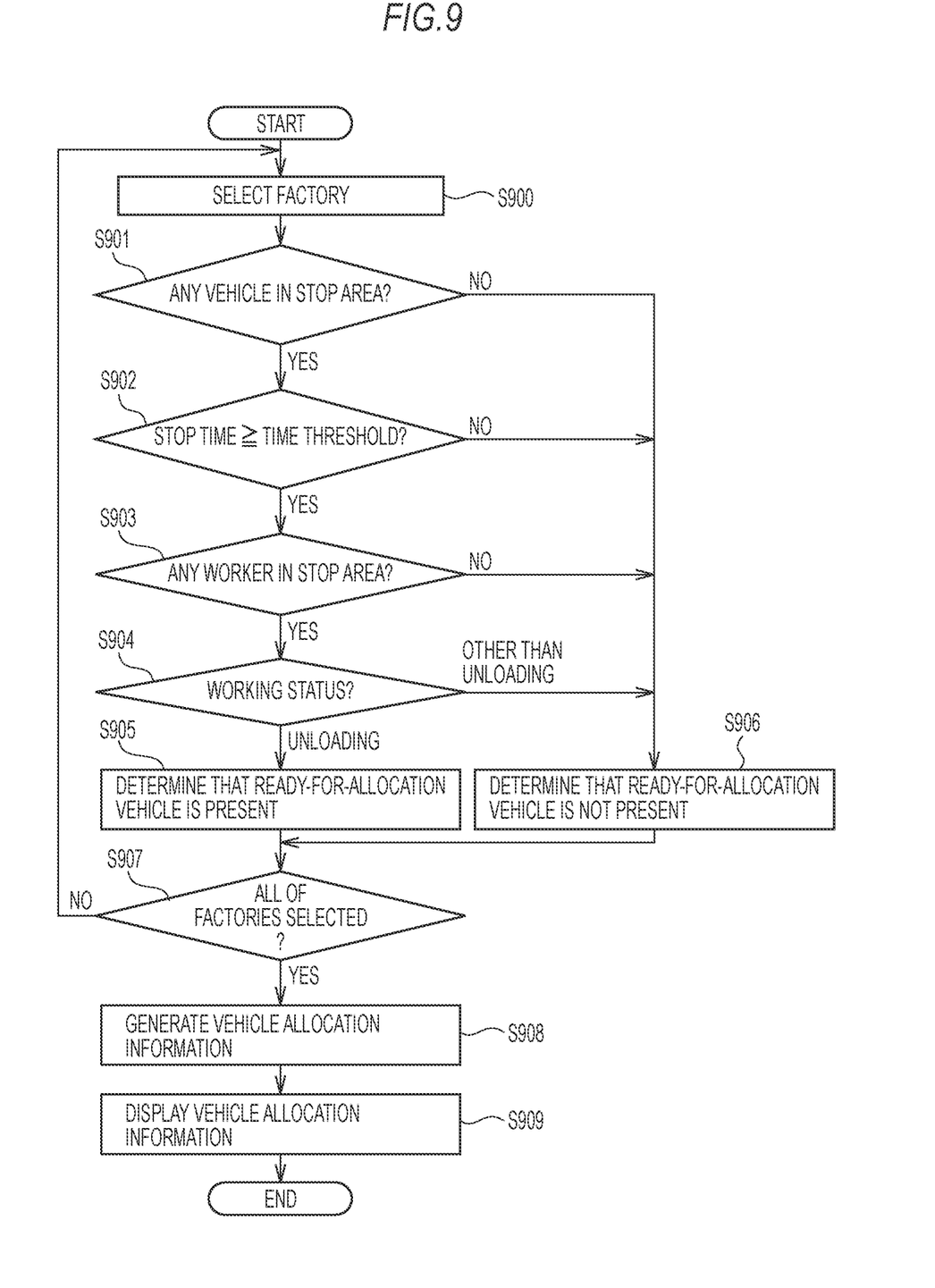
FIG. 9 is a flowchart illustrating vehicle allocation processing according to the second embodiment.

FIG. 9 is a flowchart illustrating vehicle allocation processing performed by the management server device 100 according to the second embodiment. In step S900, the vehicle allocation management unit 402 selects one factory to be processed. It is sufficient that the vehicle allocation management unit 402 successively selects all the factories, and the selection order is not limited particularly. Hereinafter, the factory selected in step S900 is referred to as a target factory. Next, in step S901, the vehicle allocation management unit 402 determines whether the vehicle 130 is present in the stop area 812 of the target factory based on tag information and radio field intensity information corresponding to the vehicle 130, which the communication processing unit 401 has received from the RFID reader 120 installed in the target factory. This processing is similar to the processing in step S501 described with reference to FIG. 5. When the vehicle allocation management unit 402 determines that the vehicle 130 is present (YES in step S901), the processing proceeds to step S902. When the vehicle allocation management unit 402 determines that the vehicle 130 is not present (NO in step S901), the processing proceeds to step S906.

Next, in step S902, the vehicle allocation management unit 402 specifies the stop time of the vehicle 130 existing in the stop area 812 based on tag information and radio field intensity reception status corresponding to the vehicle 130 that has been determined in step S901 as being present in the stop area 812. Then, when the vehicle allocation management unit 402 determines that the stop time is equal to or greater than a time threshold (YES in step S902), the processing proceeds to step S903. When the vehicle allocation management unit 402 determines that the stop time is less than the time threshold (NO in step S902), the processing proceeds to step S906. In this embodiment, the time threshold is a preset value such as 30 minutes. The processing in step S902 is performed for each vehicle if a plurality of vehicles 130 is detected in step S901.

Next, in step S903, the vehicle allocation management unit 402 determines whether the worker 140 is present in the stop area 812 of the target factory based on tag information and radio field intensity information corresponding to the worker 140, which the communication processing unit 401 has received from the RFID reader 120 of the target factory. This processing is similar to the processing in step S503 described with reference to FIG. 5. When the vehicle allocation management unit 402 determines that the worker 140 is present (YES in step S903), the processing proceeds to step S904. When the vehicle allocation management unit 402 determines that the worker 140 is not present (NO in step S903), the processing proceeds to step S906.

In step S904, the vehicle allocation management unit 402 confirms the work status. More specifically, the vehicle allocation management unit 402 specifies a motion vector of the commodity 150 with reference to tag information of the commodity 150 and determines whether the unloading is currently in progress from the direction of the motion vector. For example, when the motion vector of the commodity 150 is directed from the outside to the inside of the incoming/outgoing area 811, the vehicle allocation management unit 402 can determine that the unloading is currently in progress. On the other hand, when the motion vector of the commodity 150 is directed from the inside to the outside of the incoming/outgoing area 811, the vehicle allocation management unit 402 can determine that the loading is currently in progress. When the vehicle allocation management unit 402 determines that the unloading is currently in progress (YES in step S904), the processing proceeds to step S905. When the vehicle allocation management unit 402 determines that the unloading is not currently in progress (NO in step S904), the processing proceeds to step S906.

In step S905, the vehicle allocation management unit 402 determines that the ready-for-allocation vehicle 130 is present in the target factory. Subsequently, the processing proceeds to step S907. On the other hand, in step S906, the vehicle allocation management unit 402 determines that the ready-for-allocation vehicle 130 is not present in the target factory. Subsequently, the processing proceeds to step S907. The processing in steps 5907 to 5909 is similar to the processing in steps S507 to 5509 described with reference to FIG. 5. As mentioned above, in the second embodiment, the management server device 100 can determine whether the vehicle 130 ready for allocation is present according to the work status.

Figure 10:
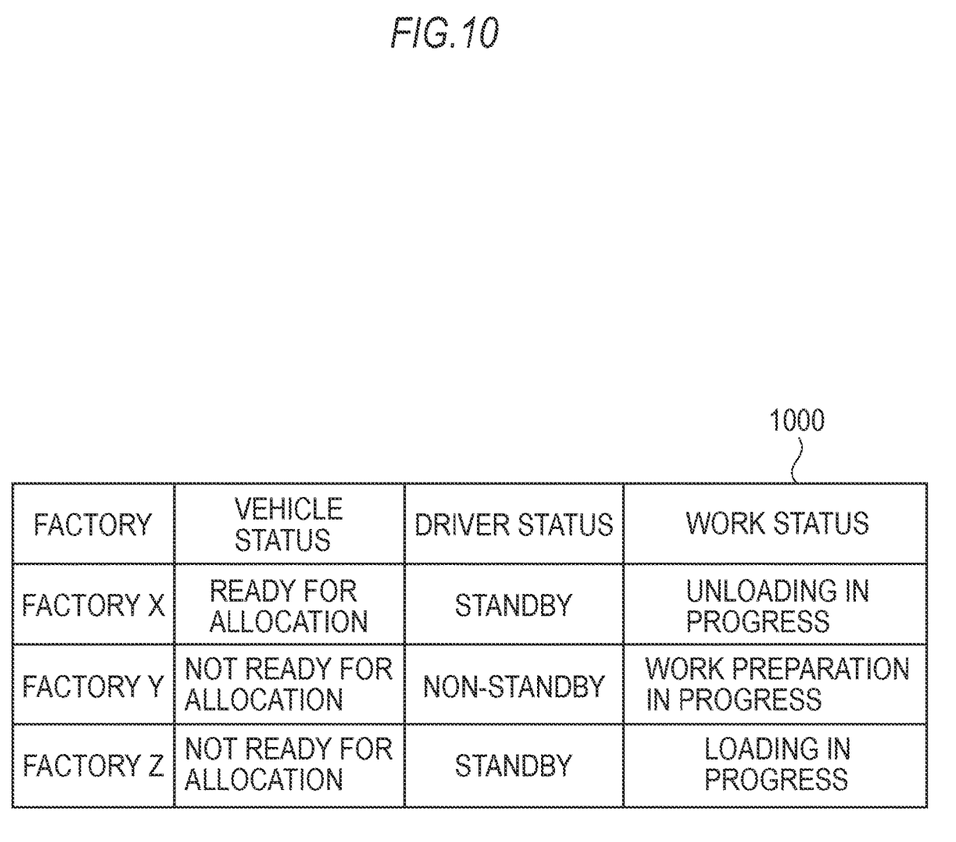
FIG. 10 is a diagram illustrating a display example of usage information according to the second embodiment.

FIG. 10 is a diagram illustrating a display example of the vehicle allocation information according to the second embodiment. Vehicle allocation information 1000 includes, for each factory, vehicle status, driver status, and work status, which are associated with each other. By viewing the vehicle allocation information 1000, the vehicle allocation manager can perform vehicle allocation appropriately, for example, can dispatch the ready-for-allocation vehicle 130 to another factory. Further, the work status in each factory can also be confirmed. The rest of the configuration and processing of the management server device 100 according to the second embodiment is similar to the configuration and processing of the management server device 100 according to the first embodiment.

As a first modified example of the second embodiment, the vehicle allocation management unit 402 may determine the work status according to a change in the number of commodities 150 in the incoming/outgoing area 811. For example, the vehicle allocation management unit 402 may determine that the unloading is currently in progress when the number of commodities 150 increases and determines that the loading is currently in progress when the number of commodities 150 decreases.

Further, as a second modified example, the management server device 100 may further specify the factory in which the ready-for-allocation vehicle 130 is present and the factory in which the ready-for-allocation vehicle 130 is not present. Further, the management server device 100 may output delivery destination information to move an available vehicle 130 to the factory in which the ready-for-allocation vehicle 130 is not present. Further, in addition to confirming the presence of the factory in which the ready-for-allocation vehicle 130 is not present, the management server device 100 may determine the destination factory to which the ready-for-allocation vehicle 130 is to be moved, based on the number of commodities 150 in the incoming/outgoing area 811 of the factory in which the ready-for-allocation vehicle 130 is not present, with reference to the planned shipping quantity. Furthermore, when a work plan in each factory is registered and a work schedule in each factory is known, the management server device 100 may determine, as a movement destination, a factory scheduled to perform a shipping work. For example, in the situation indicated by the vehicle allocation information 1000 illustrated in FIG. 10, the management server device 100 may output delivery destination information to move the vehicle 130 in the factory X to the factory Y.

As a third modified example, the management server device 100 may further determine, based on the tag information and the radio field intensity information, whether the vehicle 130 can load more commodities, and may display this result as vehicle allocation information. For example, it is assumed that the loading is completed in the factories X and Y, and the vehicle 130 has a sufficient space for loading in each factory. On the other hand, it is assumed that no vehicle 130 is stopped in the factory Z, although it is necessary in the factory Z to convey the commodities 150 placed in the incoming/outgoing area 811. The vehicle allocation manager can grasp such a situation by viewing the vehicle allocation information and can move the vehicle 130 in either the factory X or the factory Y to the factory Z.

As a fourth modified example, it is assumed that there are constraint conditions on the commodities 150 that can be loaded simultaneously in one vehicle 130 depending on the type of the commodities 150. In this case, the management server device 100 stores in advance the constraint conditions relating to the loading of such commodities 150, and determines whether the constraint conditions are satisfied based on the type information included in the tag information of the commodity 150. Further, when the constraint conditions are satisfied, the management server device 100 may determine that the vehicle 130 is ready for allocation to the factory that delivers the commodities 150. The constraint conditions are, for example, that commodities loaded on a vehicle in a factory (first factory) and commodities in a shipping preparation area of another factory (second factory) are components to be used for assembling the same finished products and can be loaded together, and commodities loaded on a vehicle in still another factory (third factory) and commodities in the shipping preparation area of the second factory are components to be used for assembling different finished products and cannot be loaded together. Further, as another example, the vehicle allocation manager may propose vehicle allocation according to the type of the commodities 150.

According to the above-described processing in each embodiment, hardware resources can be efficiently used and vehicle allocation management processing can be performed speedily and efficiently.

By the way, the vehicle allocation management system described in the above embodiment is also applicable to the management of vehicles for rental bicycle (bicycle sharing) or car sharing. This can be easily understood by imagining a case where the vehicle 130 to which the above-described RFID tag is attached is replaced by a bicycle for the rental cycling or an automobile for the car sharing. Hereinafter, an embodiment relating to the rental bicycle will be described supplementarily.

The management server device 100 manages the usage status of bicycles at each of a plurality of cycle ports (shared bicycle storage areas) for rental bicycle. The management server device 100 wirelessly communicates with the RFID reader provided at each of the plurality of cycle ports. In each cycle port, it is supposed that an unused bicycle is stopped in the stop area 113. The RFID reader 120 is installed at a position adjacent to the stop area 113. The RFID reader 120 can determine whether an information transmission source is present in the stop area 113 with reference to the radio field intensity received from the RFID tag. Then, similar to the above-described embodiment, in the management server device 100, the vehicle allocation management unit 402 performs vehicle allocation related processing, in each cycle port, for example, determines whether there is a bicycle (vehicle 130) that is available (namely, ready for allocation) for rental bicycle, for a user.

The vehicle allocation information generation unit 403 generates vehicle allocation information (information based on a determination result by the vehicle allocation management unit 402, stop time, presence of a user, and the like). The vehicle allocation management unit 402 specifies the stop time of a bicycle existing in the stop area 113 based on tag information and radio field intensity reception status corresponding to the bicycle having been determined as being present in the stop area 113. Further, the vehicle allocation information generation unit 403 may control the display unit 305 to display the vehicle allocation information.

The configuration of the display unit 305 is not limited to the form integral with the management server device 100. The management server device 100 is not limited to a terminal installed on the cycle port, and may be configured on a cloud server to manage, via the Internet, information from the RFID. In such a case, the display unit 305 may be configured as a part of the terminal installed on the cycle port. Further, as another example, a screen of a smartphone terminal owned by a user of the rental bicycle may be configured so as to serve as the display unit 305. That is, the management server device 100 acquires RFID related information from the RFID reader, via a network such as the Internet, and transmits vehicle allocation information to the display unit 305 configured in the smartphone or the like, via the network such as the Internet.

In this embodiment, it is sufficient that the vehicle allocation information is any information representing the availability of a bicycle. Not only a full-time vehicle allocation manager can refer to the vehicle allocation information, but also rental bicycle users can grasp available bicycles with reference to the vehicle allocation information, for example, by using a smartphone own by the user. Needless to say, the vehicle allocation information can be used when a rental bicycle service provider (rental bicycle business operator) manages bicycle information in each cycle port. For example, a person in charge of the rental bicycle business can refer to the vehicle allocation information to confirm the availability of bicycles in a cycle port A and the availability of bicycles in another cycle port B. Based on such information, the person in charge can also instruct an operator at the site to transfer bicycles between ports. In this case, the vehicle allocation information generation unit 403 may generate port-to-port transfer recommendation information indicating a source port and a destination port when transferring a vehicle.

Needless to say, the vehicle allocation management unit 402 may determine whether there is a bicycle user based on tag information and radio field intensity information corresponding to the bicycle user, as described above as examples of warehouses and factories. Further, the tag information of a bicycle user may be information from a smartphone or the like of the bicycle user, and it is needless to say that the type of the tag information may be different from that of tag information transmitted from the vehicle. For example, when a dedicated application capable of generating and transmitting tag information is installed in a smartphone and the application is activated, the tag information can be generated and transmitted via the smartphone.

Further, as another example, in a case where a home delivery company uses bicycles for home delivery services, the vehicle allocation management unit 402 may generate, at a cycle port where the bicycles owned by the company are parked, vehicle allocation information so as to include information from a tag attached to a commodity, that is, so as to take the status of loading or the like into account. It can be understood by a person skilled in the art that this mechanism is similar to that of the above-described embodiment of the outgoing area 112.

As mentioned above, although the case of using rental bicycles has been described in this embodiment, it will be easily understood that the present invention is also applicable to vehicle management for car sharing or car rental if bicycles are replaced by automobiles and cycle ports are replaced by parking areas of automobiles.

In addition, it is needless to say that the vehicle allocation management system according to the present embodiment is applicable to shopping malls, golf courses, and other various amusement parks. For example, in a large shopping mall located in a suburb, the availability of shopping carts can be managed. That is, when shopping carts are regarded as vehicles, attaching an RFID tag to each shopping cart and installing RFID readers in shopping cart storage areas near a plurality of entrances of the large shopping mall enables the vehicle allocation management unit 402 to generate vehicle allocation information, in the management server device 100, in the same manner as in the above-described examples of warehouses, factories, or rental bicycles. In this case, the management server device 100 may be installed in, for example, an employee-only room in the shopping mall. Further, the display unit 305 may be installed, as a dedicated terminal, in the vicinity of the shopping cart storage area or may be configured as a part of a smartphone terminal owned by a shopper who has installed a dedicated application.

Further, in an application example of the vehicle allocation management system for a golf course, golf carts used when moving between courses can be regarded as the above-described vehicles. Further, the vehicle allocation management system is applicable to amusement vehicles in an amusement park. Moreover, the vehicle allocation management system is applicable not only to land vehicles but also to water vehicles. For example, in a case where the lending of swan-shaped paddle boats is performed at a pond in a park, regarding the swan-shaped paddle boats as vehicles and installing an RFID reader at a swan-shaped paddle boat stop enables the vehicle allocation management system to manage the allocation of the swan-shaped paddle boats in the same manner. The boats are not limited to swan-shaped paddle boats and may be cycle boats or rowboats.

Other Embodiments

The present invention is also realized by executing the following processing. More specifically, the processing supplies software (program) capable of realizing the functions of the above-described embodiments via a network or various storage media to a system or a device. Further, the processing causes a computer (or a CPU, an MPU, or the like) of the system or the device to read out and execute the program.

Although the preferred embodiments of the present invention have been described in detail, the present invention is not limited to these specific embodiments and may be modified or changed in various ways within the scope of the present invention described in the appended claims.

The invention claimed is:

1. A vehicle allocation management device that can wirelessly communicate with a first reader device installed correspondingly to a stop area of a vehicle and with a second reader device installed at a position corresponding to a commodity accumulation area, comprising:
   a receiver configured to receive, from the first reader device, radio field intensity information indicating the intensity of a radio field when the first reader device has received information from an electronic tag attached to the vehicle;
   a vehicle determiner configured to determine, based on the radio field intensity information, whether the vehicle is present in the stop area;
   a vehicle allocation determiner configured to determine whether the vehicle is ready for allocation based on whether the vehicle is continuously present in the stop area for a predetermined time or more, wherein the second reader device receives, from an electronic tag attached to a commodity, type information indicating the commodity, the receiver further receives, from the second reader device, radio field intensity information indicating the intensity of a radio field when the commodity type information has been received, which has been received by the second reader device, and the commodity type information; and
   a commodity number specifier configured to specify the number of commodities that are present in the accumulation area based on the commodity type information and the radio field intensity information, which have been received by the receiver, is further provided, and wherein the vehicle allocation determiner is further configured to determine whether the vehicle is ready for allocation based on the number of commodities specified by the commodity number specifier.

2. The vehicle allocation management device according to claim 1, further comprising:
   an output controller configured to control the output of vehicle allocation information based on a determination result obtained by the vehicle allocation determiner.

3. The vehicle allocation management device according to claim 2, wherein
   the vehicle allocation management device receives the radio field intensity information from each of a plurality of first reader devices corresponding to a plurality of stop areas provided in a plurality of management areas respectively,
   an area specifier configured to specify a management area that requires vehicle allocation based on a determination result obtained by the vehicle allocation determiner is further provided, and
   the output controller controls the output of delivery destination information indicating the area specified by the area specifier as a delivery destination of a vehicle ready for allocation.

4. The vehicle allocation management device according to claim 1, wherein
   the electronic tag of the vehicle transmits type information indicating the vehicle,
   the first reader device receives the type information from the electronic tag of the vehicle, and further receives type information indicating a person from an electronic tag attached to the person,
   the receiver further receives, from the first reader device, radio field intensity information corresponding to the information transmitted from the electronic tag of the person,
   a person determiner configured to determine whether the person is present in the stop area based on the radio field intensity information corresponding to the information transmitted from the electronic tag of the person is further provided, and
   the vehicle allocation determiner further determines whether the vehicle is ready for allocation based on a determination result obtained by the person determiner.

5. The vehicle allocation management device according to claim 4, wherein
   the vehicle allocation determiner determines that the vehicle is ready for allocation when the vehicle is continuously present in the stop area for a predetermined time or more and the person is present in the stop area.

6. The vehicle allocation management device according to claim 4, further comprising:
   a riding determiner configured to determine whether a person is on the vehicle based on the radio field intensity information corresponding to the person and the radio field intensity information corresponding to the vehicle, wherein
   the vehicle allocation determiner further determines whether the vehicle is ready for allocation based on a determination result obtained by the riding determiner.

7. The vehicle allocation management device according to claim 6, wherein
   the vehicle allocation determiner determines that the vehicle is ready for allocation when it is determined that the vehicle is continuously present in the stop area for a predetermined time or more and the person is on the vehicle.

8. The vehicle allocation management device according to claim 1, wherein
   the receiver receives, from an external device, information about a commodity whose carry-out preparation has been completed, and
   the vehicle allocation determiner further determines whether the vehicle is ready for allocation based on the information about the commodity received by the receiver.

9. The vehicle allocation management device according to claim 1, wherein
   the vehicle allocation determiner determines that the vehicle is ready for allocation when the vehicle is continuously present in the stop area for a predetermined time or more and the number of commodities in the accumulation area is equal to or greater than a threshold.

10. The vehicle allocation management device according to claim 1, further comprising:
    a work specifier configured to specify a work status of the vehicle in the stop area based on identification information and radio field intensity information corresponding to the commodity, wherein the vehicle allocation determiner further determines whether the vehicle is ready for allocation based on the work status specified by the work specifier.

11. The vehicle allocation management device according to claim 1, wherein
- the electronic tag of the vehicle transmits type information indicating the vehicle,
- the first reader device receives the type information from the electronic tag of the vehicle, and further receives type information indicating a commodity from an electronic tag attached to the commodity,
- the receiver further receives, from the first reader device, radio field intensity information corresponding to the information transmitted from the electronic tag of the commodity,
- a loading determiner configured to determine whether the commodity is loaded on the vehicle based on the radio field intensity of the vehicle and the radio field intensity of the commodity is further provided, and
- the vehicle allocation determiner further determines whether the vehicle is ready for allocation based on a determination result obtained by the loading determiner.

12. The vehicle allocation management device according to claim 11, wherein
- the vehicle allocation determiner determines that the vehicle is ready for allocation when it is determined that the vehicle is continuously present in the stop area for a predetermined time or more and no commodity is loaded on the vehicle.

13. A vehicle allocation management system that can wirelessly communicate with a first reader device installed correspondingly to a stop area of a vehicle and with a second reader device installed at a position corresponding to a commodity accumulation area, comprising:
- a receiver configured to receive, from the first reader device, radio field intensity information indicating the intensity of a radio field when the first reader device has received information from an electronic tag attached to the vehicle;
- a vehicle determiner configured to determine, based on the radio field intensity information, whether the vehicle is present in the stop area;
- a vehicle allocation determiner configured to determine whether the vehicle is ready for allocation based on whether the vehicle is continuously present in the stop area for a predetermined time or more, wherein the second reader device is configured to receive, from an electronic tag attached to a commodity, type information indicating the commodity, and the receiver is further configured to receive, from the second reader device, radio field intensity information indicating the intensity of a radio field when the commodity type information has been received, which has been received by the second reader device, and the commodity type information; and
- a commodity number specifier is configured to specify the number of commodities that are present in the accumulation area based on the commodity type information and the radio field intensity information, which have been received by the receiver, is further provided, and the vehicle allocation determiner is further configured to determine whether the vehicle is ready for allocation based on the number of commodities specified by the commodity number specifier.

14. A vehicle allocation management method that is executed by a vehicle allocation management device that can wirelessly communicate with a first reader device installed correspondingly to a stop area of a vehicle and with a second reader device installed at a position corresponding to a commodity accumulation area, the method comprising:
- a reception step of receiving, from the first reader device, radio field intensity information indicating the intensity of a radio field when the first reader device has received information from an electronic tag attached to the vehicle;
- a vehicle determination step of determining, based on the radio field intensity information, whether the vehicle is present in the stop area;
- a vehicle allocation determination step of determining whether the vehicle is ready for allocation based on whether the vehicle is continuously present in the stop area for a predetermined time or more;
- a step of receiving, by the second reader device, from an electronic tag attached to a commodity, type information indicating the commodity, the reception step further including receiving, from the second reader device, radio field intensity information indicating the intensity of a radio field when the commodity type information has been received, which has been received by the second reader device, and the commodity type information; and
- a step of specifying, by a commodity number specifier, the number of commodities that are present in the accumulation area based on the commodity type information and the radio field intensity information, which have been received by the receiver, wherein the vehicle allocation determination step further determines whether the vehicle is ready for allocation based on the number of commodities specified by the commodity number specifier.

15. A computer-readable non-transitory storage medium storing a program that causes a computer of a vehicle allocation management device that can wirelessly communicate with a first reader device installed correspondingly to a stop area of a vehicle and with a second reader device installed at a position corresponding to a commodity accumulation area to function as:
- a receiver configured to receive, from the first reader device, radio field intensity information indicating the intensity of a radio field when the first reader device has received information from an electronic tag attached to the vehicle;
- a vehicle determiner configured to determine, based on the radio field intensity information, whether the vehicle is present in the stop area;
- a vehicle allocation determiner configured to determine whether the vehicle is ready for allocation based on whether the vehicle is continuously present in the stop area for a predetermined time or more, wherein the second reader device receives, from an electronic tag attached to a commodity, type information indicating the commodity, and the receiver further receives, from the second reader device, radio field intensity information indicating the intensity of a radio field when the commodity type information has been received, which has been received by the second reader device, and the commodity type information; and
- a commodity number specifier configured to specify the number of commodities that are present in the accumulation area based on the commodity type information and the radio field intensity information, which have been received by the receiver, is further provided, and wherein the vehicle allocation determiner is further configured to determine whether the vehicle is ready for allocation based on the number of commodities specified by the commodity number specifier.

\* \* \* \* \*